United States Patent
Smirnov et al.

(10) Patent No.: US 10,262,401 B2
(45) Date of Patent: Apr. 16, 2019

(54) NOISE REDUCTION USING SEQUENTIAL USE OF MULTIPLE NOISE MODELS

(71) Applicant: Apple Inc., Cupertino, CA (US)

(72) Inventors: Maxim W. Smirnov, Wilsonville, CA (US); D. Amnon Silverstein, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 113 days.

(21) Appl. No.: 15/499,659

(22) Filed: Apr. 27, 2017

(65) Prior Publication Data

US 2018/0315172 A1 Nov. 1, 2018

(51) Int. Cl.
G06T 5/00 (2006.01)
G06T 5/10 (2006.01)
G06T 7/00 (2017.01)

(52) U.S. Cl.
CPC .............. G06T 5/10 (2013.01); G06T 7/0002 (2013.01); G06T 2207/20028 (2013.01); G06T 2207/20172 (2013.01)

(58) Field of Classification Search
None
See application file for complete search history.

(56) References Cited

U.S. PATENT DOCUMENTS

| 7,889,949 B2 | 2/2011 | Cohen et al. | |
| 8,594,452 B2 | 11/2013 | Chen | |
| 8,855,416 B2 | 10/2014 | Jang et al. | |
| 2007/0165962 A1* | 7/2007 | Smirnov | G06K 9/40 382/260 |
| 2008/0267494 A1* | 10/2008 | Cohen | G06T 3/4007 382/166 |
| 2010/0073522 A1* | 3/2010 | Siddiqui | G06T 5/002 348/241 |
| 2010/0182452 A1* | 7/2010 | Utsugi | H04N 5/217 348/231.2 |
| 2010/0183240 A1* | 7/2010 | Hiraga | G06T 5/002 382/264 |
| 2010/0253811 A1* | 10/2010 | On | H04N 5/144 348/241 |
| 2011/0032392 A1* | 2/2011 | Litvinov | G06T 3/4015 348/241 |
| 2011/0102647 A1* | 5/2011 | Kim | H04N 5/361 348/243 |
| 2015/0188588 A1* | 7/2015 | Groh | H03H 17/0267 375/340 |

* cited by examiner

Primary Examiner — Delomia L Gilliard
(74) Attorney, Agent, or Firm — Fenwick & West LLP (57) ABSTRACT

Embodiments of the present disclosure relate to performing noise reduction on an input image by first filtering the input image based on coarse noise models of pixels and then subsequently filtering the filtered input image based on finer noise models. The finer noise models use the same or more number of neighboring pixels than the coarse noise filters. The first filtering and subsequent filtering of a pixel in the input image use Mahalanobis distances between the pixel and its neighboring pixels. By performing iterations of filtering using more refined noise models, the noise reduction in the input image can be performed more efficiently and effectively.

20 Claims, 6 Drawing Sheets

NOISE REDUCTION USING SEQUENTIAL USE OF MULTIPLE NOISE MODELS

BACKGROUND

Image data captured by an image sensor or received from other data sources is often processed in an image processing pipeline before further processing or consumption. For example, raw image data may be corrected, filtered, or otherwise modified before being provided to subsequent components such as a video encoder. To perform corrections or enhancements for captured image data, various components, unit stages or modules may be employed.

Such an image processing pipeline may be structured so that corrections or enhancements to the captured image data can be performed in an expedient way without consuming other system resources. Although many image processing algorithms may be performed by executing software programs on a central processing unit (CPU), execution of such programs on the CPU would consume significant bandwidth of the CPU and other peripheral resources as well as increase power consumption. Hence, image processing pipelines are often implemented as a hardware component separate from the CPU and dedicated to perform one or more image processing algorithms.

One of processes of the image processing pipeline is noise reduction. Noise to an image data can be introduced during various operations such as image capturing, transmission, and transformation. The nature of the noise removal problem depends on the type of the noise corrupting the image data, and different types of linear and nonlinear filtering methods are often used to reduce noise in image data. Linear filters are not able to effectively eliminate impulse noise as they have a tendency to blur the edges of an image. On the other hand nonlinear filters are suited for dealing with impulse noise.

SUMMARY

Embodiments relate to performing noise reduction on image data by using multiple noise models. A first noise model is built for a pixel in an input image using pixel values of first neighboring pixels in the input image. First Mahalanobis distances between the pixel and the first neighboring pixels are computed based on the first noise model. Filtering is performed on the pixel based on the first Mahalanobis distances to obtain a first filtered image. A second noise model is built for the pixel using pixel values of second neighboring pixels. Second Mahalanobis distances between the pixel and the second neighboring pixels are computed based on the second noise model. Filtering is performed on the first filtered image based on the second Mahalanobis distances to obtain a second filtered image.

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to performing noise reduction on an input image by first filtering the input image based on coarse noise models of pixels and then subsequently filtering the filtered input image based on finer noise models. The finer noise models use the same or more number of neighboring pixels than the coarse noise filters. The first filtering and subsequent filtering of a pixel in the input image use Mahalanobis distances between the pixel and its neighboring pixels. By performing iterations of filtering using more refined noise models, the noise reduction in the input image can be performed more efficiently and effectively.

Neighboring pixels of a pixel described herein refers to a set of pixels that within a predetermined spatial distance from the pixel. For example, neighboring pixels may be 8 pixels adjacent to the pixel (i.e., spatial distance is 1) or 24 pixels adjacent to the pixel or one pixel spaced apart from the pixel (i.e., spatial distance is 2).

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

Figure 1:
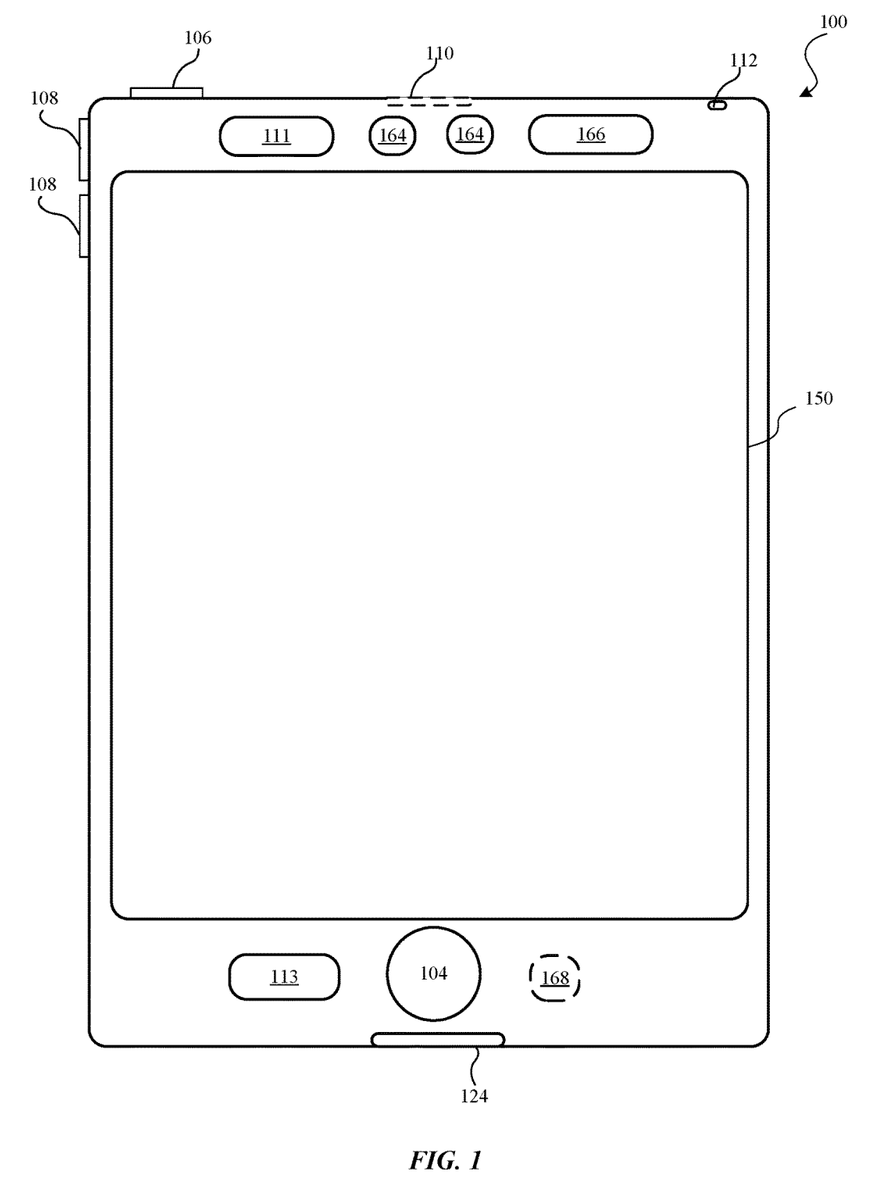
FIG. 1 is a high-level diagram of an electronic device, according to one embodiment

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. The device 100 may include components not shown in FIG. 1.

Device 100 is only one example of an electronic device, and device 100 may have more or fewer components than listed above, some of which may be combined into a components or have a different configuration or arrangement. The various components of device 100 listed above are embodied in hardware, software, firmware or a combination thereof, including one or more signal processing and/or application specific integrated circuits (ASICs).

Figure 2:
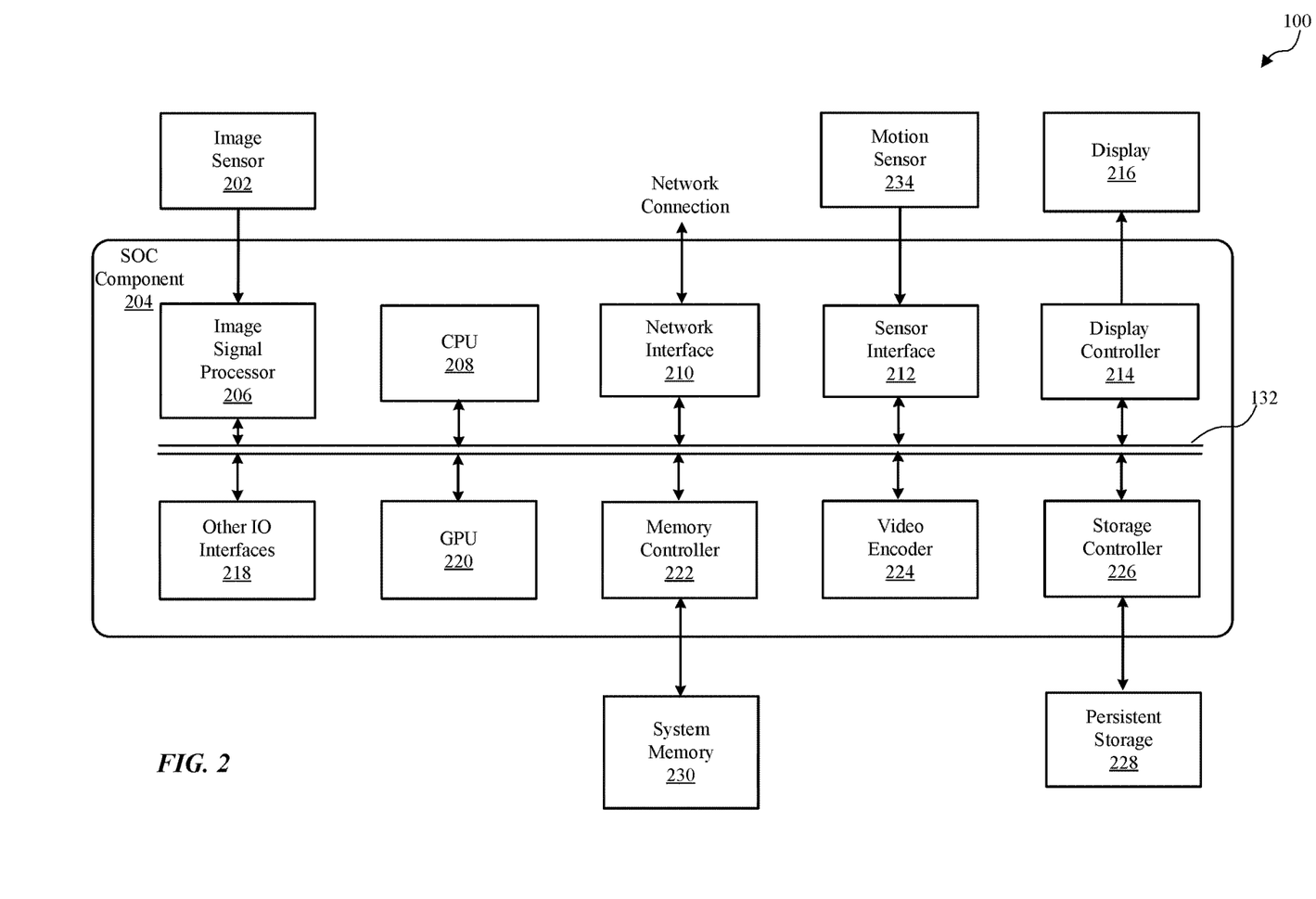
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, motion sensor 234, and display 216. The components as illustrated in FIG. 2 are merely illustrative. For example, device 100 may include other components (such as speaker or microphone) that are not illustrated in FIG. 2. Further, some components (such as orientation sensor 234) may be omitted from device 100.

Image sensor 202 is a component for capturing image data and may be embodied, for example, as a complementary metal-oxide-semiconductor (CMOS) active-pixel sensor, a camera, video camera, or other devices. Image sensor 202 generates raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensor 202 may be in a Bayer color filter array (CFA) pattern (hereinafter also referred to as "Bayer pattern").

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), NAND or NOR flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, sensor interface 212, display controller 214, graphics processor (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Sensor interface 212 is circuitry for interfacing with motion sensor 234. Sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor 220 or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface w10 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensor 202 and processed by ISP 206, and then sent to system memory 230 via bus 232 and memory controller 222. After the image data is stored in system memory 230, it may be accessed by video encoder 224 for encoding or by display 116 for displaying via bus 232.

In another example, image data is received from sources other than the image sensor 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
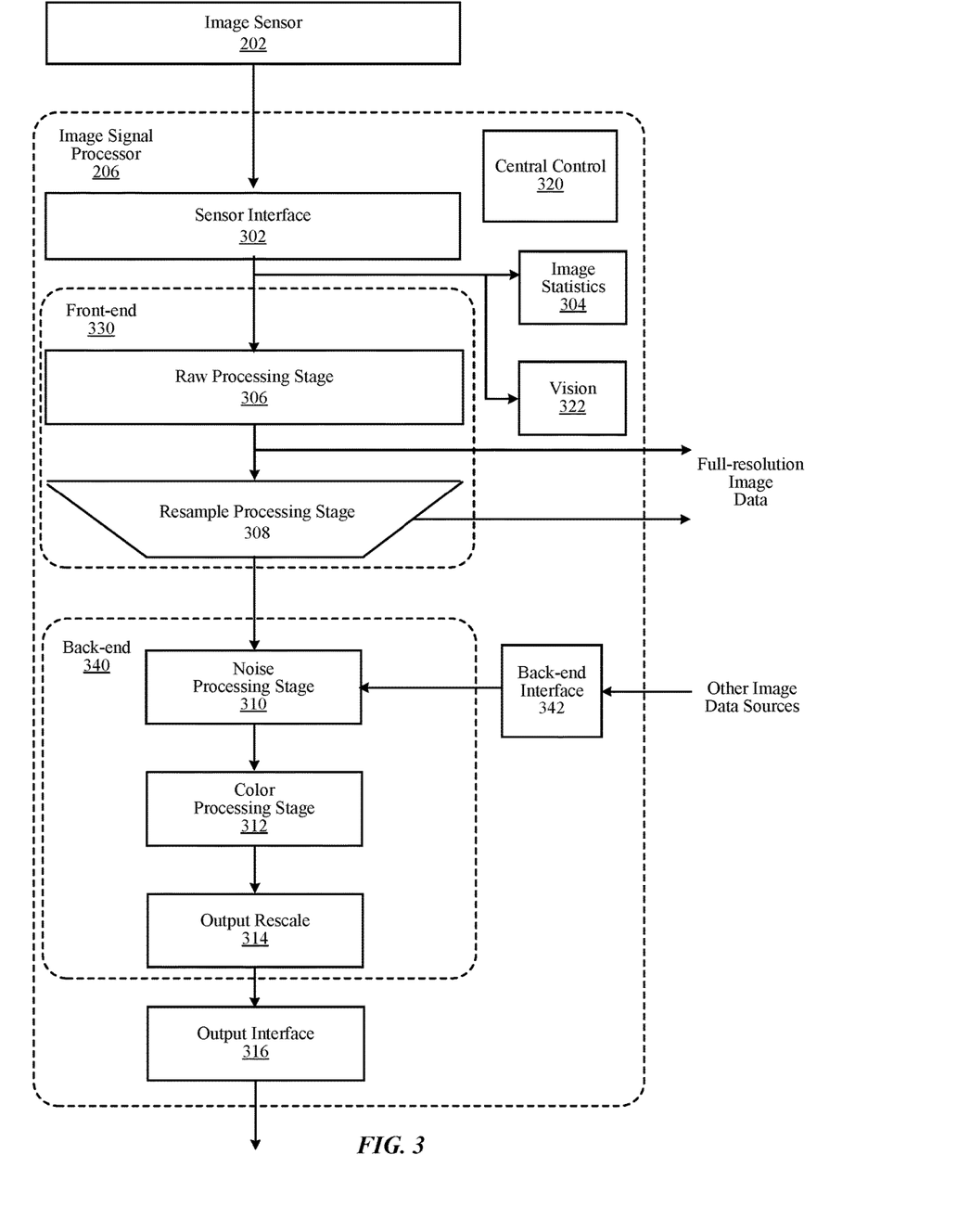
FIG. 3 is a block diagram illustrating image processing pipelines implemented using an image signal processor, according to one embodiment.

FIG. 3 is a block diagram illustrating image processing pipelines implemented using ISP 206, according to one embodiment. In the embodiment of FIG. 3, ISP 206 is coupled to image sensor 202 to receive raw image data. ISP 206 implements an image processing pipeline which may include a set of stages that process image information from creation, capture or receipt to output. ISP 206 may include, among other components, sensor interface 302, central control 320, front-end pipeline stages 330, back-end pipeline stages 340, image statistics module 304, vision module 322, back-end interface 342, and output interface 316. ISP 206 may include other components not illustrated in FIG. 3 or may omit one or more components illustrated in FIG. 3.

In one or more embodiments, different components of ISP 206 process image data at different rates. In the embodiment of FIG. 3, front-end pipeline stages 330 (e.g., raw processing stage 306 and resample processing stage 308) may process image data at an initial rate. Thus, the various different techniques, adjustments, modifications, or other processing operations performed by these front-end pipeline stages 330 at the initial rate. For example, if the front-end pipeline stages 330 process 2 pixels per clock cycle, then raw processing stage 306 operations (e.g., black level compensation, highlight recovery and defective pixel correction) may process 2 pixels of image data at a time. In contrast, one or more back-end pipeline stages 340 may process image data at a different rate less than the initial data rate. For example, in the embodiment of FIG. 3, back-end pipeline stages 340 (e.g., noise processing stage 310, color processing stage 312, and output rescale 314) may be processed at a reduced rate (e.g., 1 pixel per clock cycle). Although embodiments described herein include embodiments in which the one or more back-end pipeline stages 340 process image data at a different rate than an initial data rate, in some embodiments back-end pipeline stages 340 may process image data at the initial data rate.

Sensor interface 302 receives raw image data from image sensor 202 and processes the raw image data into an image data processable by other stages in the pipeline. Sensor interface 302 may perform various preprocessing operations, such as image cropping, binning or scaling to reduce image data size. In some embodiments, pixels are sent from the image sensor 202 to sensor interface 302 in raster order (i.e., horizontally, line by line). The subsequent processes in the pipeline may also be performed in raster order and the result may also be output in raster order. Although only a single image sensor and a single sensor interface 302 are illustrated in FIG. 3, when more than one image sensor is provided in device 100, a corresponding number of sensor interfaces may be provided in ISP 206 to process raw image data from each image sensor.

Front-end pipeline stages 330 process image data in raw or full-color domains. Front-end pipeline stages 330 may include, but are not limited to, raw processing stage 306 and resample processing stage 308. A raw image data may be in Bayer raw format, for example. In Bayer raw image format, pixel data with values specific to a particular color (instead of all colors) is provided in each pixel. In an image capturing sensor, image data is typically provided in a Bayer pattern. Raw processing stage 306 may process image data in a Bayer raw format.

The operations performed by raw processing stage 306 include, but are not limited, sensor linearization, black level compensation, fixed pattern noise reduction, defective pixel correction, raw noise filtering, lens shading correction, white balance gain, and highlight recovery. Sensor linearization refers to mapping non-linear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing noise of image data by averaging neighbor pixels that are similar in brightness. Highlight recovery refers to estimating pixel values for those pixels that are clipped (or nearly clipped) from other channels. Lens shading correction refers to applying a gain per pixel to compensate for a dropoff in intensity roughly proportional to a distance from a lens optical center. White balance gain refers to providing digital gains for white balance, offset and clip independently for all color components (e.g., Gr, R, B, Gb in Bayer format). Components of ISP 206 may convert raw image data into image data in full-color domain, and thus, raw processing stage 306 may process image data in the full-color domain in addition to or instead of raw image data.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in a Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform special image effects, including black and white conversion, sepia tone conversion, negative conversion, or solarize conversion. For the purpose of Gamma mapping, lookup tables (or other structures that index pixel values to another value) for different color components or channels of each pixel (e.g., a separate lookup table for Y, Cb, and Cr color components) may be used. Color space conversion refers to converting color space of an input image data into a different format. In one embodiment, resample processing stage 308 converts RBD format into YCbCr format for further processing.

Central control module 320 may control and coordinate overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control module 320 may update programmable parameters for other components in ISP 206 while the other components are in an idle state. After updating the programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, mask patterned defective pixels, sub-sample raw image data, detect and replace non-patterned defective pixels, black level compensation, lens shading correction, and inverse black level compensation. After performing one or more of such operations, statistics information such as 3A statistics (Auto white balance (AWB), auto exposure (AE), auto focus (AF)), histograms (e.g., 2D color or component) and any other image data information may be collected or tracked. In some embodiments, certain pixels' values, or areas of pixel values may be excluded from collections of certain statistics data (e.g., AF statistics) when preceding operations identify clipped pixels. Although only a single statistics module 304 is illustrated in FIG. 3, multiple image statistics modules may be included in ISP 206. In such embodiments, each statistic module may be programmed by central control module 320 to collect different information for the same or different image data.

Vision module 322 performs various operations to facilitate computer vision operations at CPU 208 such as facial detection in image data. The vision module 322 may perform various operations including pre-processing, global tone-mapping and Gamma correction, vision noise filtering, resizing, keypoint detection, convolution and generation of histogram-of-orientation gradients (HOG). The pre-processing may include subsampling or binning operation and computation of luminance if the input image data is not in YCrCb format. Global mapping and Gamma correction can be performed on the pre-processed data on luminance image. Vision noise filtering is performed to remove pixel defects and reduce noise present in the image data, and thereby, improve the quality and performance of subsequent computer vision algorithms. Such vision noise filtering may include detecting and fixing dots or defective pixels, and performing bilateral filtering to reduce noise by averaging neighbor pixels of similar brightness. Various vision algorithms use images of different sizes and scales. Resizing of an image is performed, for example, by binning or linear interpolation operation. Keypoints are locations within an image that are surrounded by image patches well suited to matching in other images of the same scene or object. Such keypoints are useful in image alignment, computing camera pose and object tracking. Keypoint detection refers to the process of identifying such keypoints in an image. Convolution may be used in image/video processing and machine vision. Convolution may be performed, for example, to generate edge maps of images or smoothen images. HOG provides descriptions of image patches for tasks in mage analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations.

Back-end interface 342 receives image data from other image sources than image sensor 102 and forwards it to other components of ISP 206 for processing. For example, image data may be received over a network connection and be stored in system memory 230. Back-end interface 342 retrieves the image data stored in system memory 230 and provide it to back-end pipeline stages 340 for processing. One of many operations that are performed by back-end interface 342 is converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform special image effects. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (i.e. no color). In some embodiment, the luma sharpening and chroma suppression may be performed simultaneously with spatial nose filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame (and thus is not a spatially filtered reference frame).

Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three dimensional array of color component output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as the ISP 206 processes image data. Output rescale module 314 may compute a fractional input coordinate for each pixel and uses this fractional coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may automatically generate a guess as to the center of the vertical support window. In some embodiments, output rescale module 314 may implement a table of piecewise perspective transforms encoded as digital difference analyzer (DDA) steppers to perform a per-pixel perspective transformation between a input image data and output image data in order to correct artifacts and motion caused by sensor motion during the capture of the image frame. Output rescale may provide image data via output interface 316 to various other components of device 100, as discussed above with regard to FIGS. 1 and 2.

In various embodiments, the functionally of components 302 through 342 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware or software.

Example Pipelines Associated with Multiple Band Noise Reduction Circuit

Figure 4:
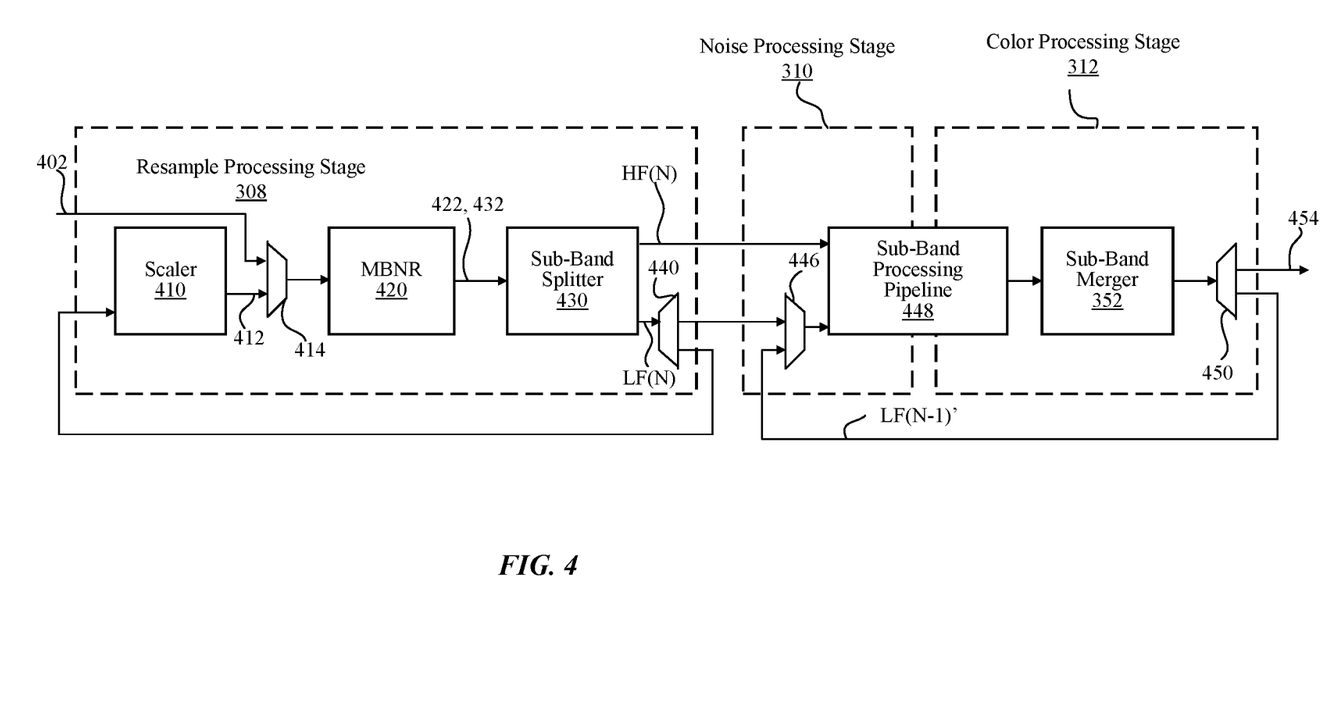
FIG. 4 is a block diagram illustrating a portion of the image processing pipeline including a multiple band noise reduction circuit, according to one embodiment.

FIG. 4 is a block diagram illustrating a portion of the image processing pipeline including a multiple band noise reduction (MBNR) circuit 420, according to one embodiment. In the embodiment of FIG. 4, MBNR circuit 420 is part of a resample processing stage 308 that also includes, among other components, a scaler 410 and a sub-band splitter circuit 430. The resample processing stage 308 performs scaling, noise reduction, and sub-band splitting in a recursive manner.

As a result of recursive processing, the resample processing stage 380 outputs a series of high frequency component image data HF(N) and low frequency component image data LF(N) derived from an original input image 420 where N represents the levels of downsampling performed on the original input image 402. For example, HF(0) and LF(0) represent a high frequency component image data and a low frequency component image data split from the original input image 402, respectively, while HF(1) and LF(1) represent a high frequency component image data and a low frequency component image data split from a first downscaled version of the input image 402, respectively.

MBNR circuit 420 is a circuit that performs noise reduction on multiple bands of the input image 402 by processing progressively downscaled versions of the input image 402. The input image 402 is first passed on through a multiplexer 414 to MBNR circuit 420 for noise reduction. The noise reduced version 422 of the original input image 402 is generated by MBNR circuit 420 and fed to a sub-band splitter 430. The sub-band splitter 430 splits the noise reduced 422 version of the original input image 402 into the high frequency component image data HF(0) and the low frequency component image data LF(0). The high frequency component image data HF(0) is passed onto a sub-band processing pipeline 448 and then to a sub-band merger 352. In contrast, the low frequency component image LF(0) is passed through a demultiplexer 440 and is fed back to the resample processing stage 308 for downscaling by a scaler 410.

The scaler 410 generates a downscaled version 412 of the low frequency component image LF(0) fed to the scaler 410, and passes it onto MBNR circuit 420 via the multiplexer 414 for noise reduction. MBNR circuit 420 performs noise reduction to generate a noise reduced version 432 of the downscaled image 412 and sends it to the sub-band splitter 430 to again split the processed low frequency image data LF(0) into the high frequency component image data HF(1) and the low frequency component image data LF(1). The high frequency component image data HF(1) is sent to the sub-band processing pipeline 448 and then the sub-band merger 352 whereas the low frequency component image data LF(1) is again fed back to the scaler 410 to repeat the process within the resample processing stage 308. The process of generating a high frequency component image data HF(N) and a low frequency component image data LF(N) is repeated until the final level of band-splitting is performed by the sub-band splitter 430. When the final level of band-splitting is reached, the low frequency component image data LF(N) is passed through the demultiplexer 440 and a multiplexer 446 to the sub-band processing pipeline 448 and the sub-band merger 352.

Figure 5:
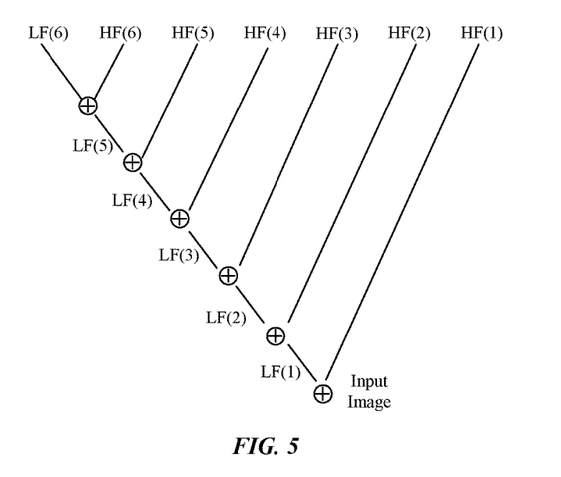
FIG. 5 is a conceptual diagram illustrating recursively sub-band splitting an input image, according to one embodiment.

FIG. 5 is a conceptual diagram illustrating recursively sub-band splitting the original input image 402, according to one embodiment. In the example of FIG. 5, the input image 402 is sub-band split 6 times by the resample processing stage 308. First, the input image 402 at the bottom of FIG. 5 splits into HF(1) and LF(1), which undergoes noise reduction process and again splits into HF(2) and LF(2), which again undergoes noise reduction process and splits into HF(3) and LF(3), and so on. The sub-band components HF(1) through HF(6) and LF(6) are passed on from the resample processing stage 308 to the sub-band processing pipeline 448.

As described above, MBNR circuit 420 performs noise reduction on the input image 402 as well as its downscaled low frequency versions of the input image 402. This enables MBNR circuit 420 to perform noise reduction on multiple bands of the original input image 402. It is to be noted, however, that only a single pass of noise reduction may be performed on the input image 402 by MBNR circuit 420 without sub-band splitting and scaling.

Referring back to FIG. 4 in the context of FIG. 5, HF(1) through HF(6) and LF(6) are processed by the sub-band processing pipeline 448 and passed onto the sub-band merger 352. The sub-band merger 352 merges processed high frequency component image data HF(N)' and processed low frequency component image data LF(N)' to generate a processed LF(N-1)'. The processed LF(N-1)' is then fed back to the sub-band merger 352 via the demultiplexer 450 and the multiplexer 446 for merging with the processed HF (N-1)' to generate a processed LF(N-2)'. The process of combining the processed high frequency component image data and the processed low frequency component data is repeated until the sub-band merger 352 generates a processed version 454 of input image that is outputted via the demultiplexer 450.

Example Architecture of Multiple Band Noise Reduction Circuit

Figure 6:
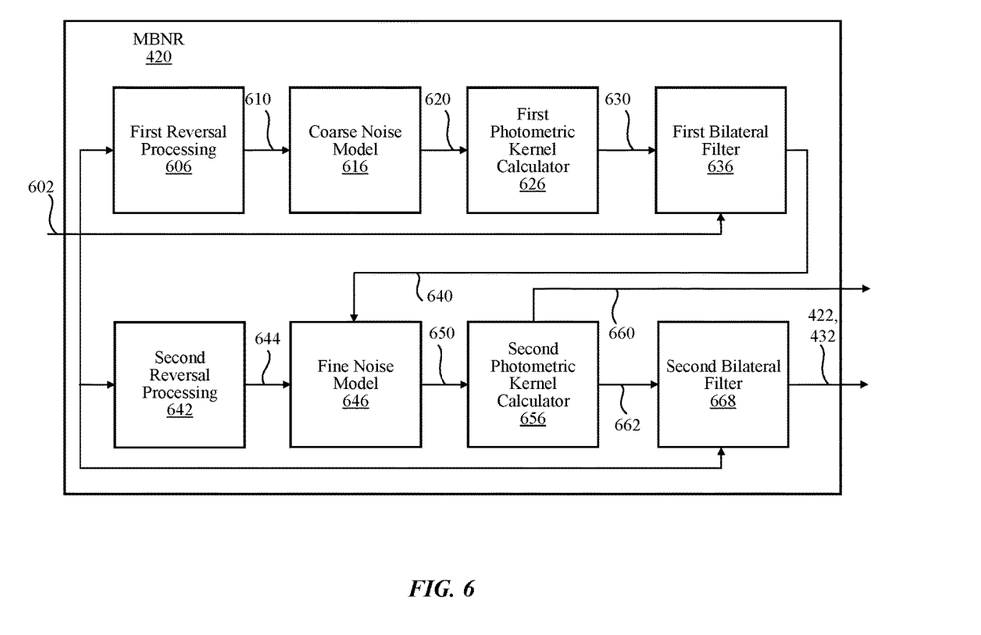
FIG. 6 is a block diagram of a multiple band noise reduction circuit, according to one embodiment.

FIG. 6 is a block diagram illustrating MBNR circuit 420, according to one embodiment. MBNR circuit 420 receive an input image data 602 and generates noise reduced image data 670 and Mahalanobis distances 660. MBNR circuit 420 may include, among other components, a first reversal processing circuit 606, a coarse noise model circuit 616, a first photometric kernel calculator circuit 626, a first bilateral filter circuit 636, a second reversal processing circuit 642, a fine noise model circuit 646, a second photometric kernel calculator circuit 656 and a second bilateral filter circuit 668. MBNR circuit 420 uses Mahalanobis distances of pixel values instead of Euclidean distances of pixel values to perform bilateral filtering, as described below in detail. The use of Mahalanobis distances is advantageous, among other reasons, because it yields better noise reduction performance than using Euclidean distances.

The first reversal processing circuit 606 is a circuit that reverses conversions and processing previously performed on raw image data. The reversed processes may also include, for example, prior linear and non-linear color space transformations (e.g., converting YCC format back to a raw image in Bayer pattern format) and lens shading correction. As a result, the reversal processing circuit 616 generates a raw image data 610, which may be in RGB color space. The reversal of image processing processes enables the subsequent processes to be performed without any distortions or noises introduced by previous image processing processes. If the input image data is a raw image, then the processing by the reversal processing circuit 606 may be omitted.

The coarse noise model circuit 616 generates a coarse noise model for each pixel in the raw image data 610. In one embodiment, the coarse noise model for a pixel is a covariance matrix at the corresponding pixel location, which is a function of a vector of a true pixel values (e.g., red, green, blue values) of the pixel location. The true pixel values are unknown, and hence, the pixel values at the pixel location in the raw image data 610 are assumed as the true pixel values for the covariance matrix. There may be no cross covariance between the pixel values of the raw image data, and therefore, the covariance matrix can be diagonal with the main diagonal including individual R, G, and B variances. The R, G and B variances for the pixel location can be calculated from a first number of pixels adjacent to the pixel location. In one embodiment, the first number of pixels are 8 pixels adjacent to the pixel location or 24 pixel within two pixel distances from the pixel location. After generating a coarse noise model for a pixel location, the coarse noise model circuit 606 proceeds to generate a coarse noise model for the next pixel location. The coarse noise models 620 are then sent to the first Mahalanobis photometric kernel calculator circuit 626.

The first photometric kernel calculator circuit 626 computes Mahalanobis distances for the pixels based on the coarse noise models 620 generated by the coarse noise model circuit 616. Mahalanobis distance MD between two vectors can be computed as:

$$MD = \sqrt{\Delta^T \Sigma^{-1} \Delta} \qquad \text{Equation 1}$$

where $\Delta$ represents a difference between vectors and $\Sigma$ represents a covariance matrix of the noise. In one embodiment, calculation of Mahalanobis distance can be simplified by transforming two vectors to a color space where covariance matrix is diagonal. The transformation can be done by the first reversal processing circuit 606.

The first bilateral filter circuit 636 performs the bilateral filtering on the input image data 602 using the photometric coefficients 630 received from the first photometric kernel calculator circuit 626. In one embodiment, the bilateral filtering performs the computation according to the following equation, which combines spatial and photometric kernels into one adaptive kernel:

$$\vec{y}[i,j] = \frac{\sum_{n=\frac{-N+1}{2}}^{\frac{N-1}{2}} \sum_{m=\frac{-M+1}{2}}^{\frac{M-1}{2}} W_P[n+m] \times W_S[n,m] \times \vec{x}[i-n, j-m]}{\sum_{n=\frac{-N+1}{2}}^{\frac{N-1}{2}} \sum_{m=\frac{-M+1}{2}}^{\frac{M-1}{2}} W_P[n,m] \times W_S[n,m]} \qquad \text{Equation 2}$$

where $\vec{y}$ represents filtered pixels values, N represents a horizontal support size of the bilateral filter, M represents a horizontal support size of the bilateral filter, $W_P$ represents coefficients of photometric kernels that are functions of the first Mahalanobis distances, $W_S$ represents coefficients of spatial kernels that can be different for different pixel components luma and chroma, $\vec{x}$ represents pixel values of the image data 610 (which can be in (YUV, YCbCr or RGB format), and i and j are current pixel indexes.

In one embodiment, photometric distances can be used to calculate coefficients 630 of a photometric filter kernel (hereinafter also referred to as "photometric coefficients"). The equation for the photometric coefficients 630 are as follows:

$$W_P[n,m] = G(MD[n,m]) \qquad \text{Equation 3}$$

where MD[n, m] represents a Mahalanobis distance between the current pixel and a [n, m] pixel in its vicinity; G represents any non-linear function (usually Gaussian). In one embodiment, the photometric coefficients can be computed as follows:

$$W_P[n,m] = 1 - \min(1, Tmp \times \text{Slope}) \qquad \text{Equation 4}$$

$$Tmp = \max(0, k[n,m]MD[n,m] - \text{Knee}) \qquad \text{Equation 5}$$

where Knee and Slope are function parameters, and k[n, m] represents a spatial adjustment coefficient.

The second reversal processing circuit 642 performs the same function and operations as the first reversal processing circuit 606 except that the second reversal processing circuit 606 provides the reverted data 644 to the fine noise model 646 instead of the coarse noise model 616.

Instead of using the filtered pixel values of the first bilateral filter 636 as the final result of MBNR circuit 420, the filtered pixel values 640 are fed to a fine noise model circuit 646 and subsequent circuits for another iteration of more refined filtering. Specifically, the fine noise model circuit 646 is fed with the reverted data 644 and the filtered pixel values 640.

Based on the reverted data 644 and the filtered pixel values 640, the fine noise model circuit 646 generates the fine noise models. For a pixel location, the fine noise models can be generated using a second number of neighboring pixels. The second number of neighboring pixel can be the same number of neighboring circuits as the first number of neighboring circuits (used in the coarse noise model circuit 616) or can be more than the first number of neighboring circuits. In order to generate the fine noise models, the fine noise model circuit 646 assumes that the filtered pixel values 640 are the true pixel values.

The second photometric kernel calculator circuit 656 computes Mahalanobis distances 660 and the photometric kernels 662 for the filtered pixel values 640 based on the fine noise models 650 generated by the fine noise model circuit 646. Other than the use of the reverted data 644 instead of the raw input pixel data and the use of the fine noise models 650 instead of the coarse noise models 620, the second photometric kernel circuit 656 performs in the same way as the first photometric kernel calculator circuit 626 to generate photometric coefficients 662, and therefore, the detailed description thereof is omitted herein for the sake of brevity.

The second bilateral filter circuit 668 performs the bilateral filtering on the input image data 602 using the photometric coefficients 662 received from the second photometric kernel calculator 656. Other than the use of the photometric kernels generated from the second photometric coefficients 660, the operation and the function of the second bilateral filter circuit 668 are the same as the first bilateral filter circuit 636, and therefore, the detailed description thereof is omitted herein for the sake of brevity. The second bilateral filter circuit 668 outputs the noise reduced version 422 of the raw image data 610 as the output of the MBNR circuit 420.

In one embodiment, the Mahalanobis distances 660 can also be output from MBNR circuit 420. The Mahalanobis distances 660 may be used, for example, by the sub-band splitter circuit 430 to identify relationships between pixels in the noise reduced version 422 of the raw image data 610.

Although the embodiment of FIG. 6 shows the filtering the raw image data in two stages, three or more stages of bilateral filtering based on gradually finer noise models may be performed to generate the noise reduced version of the raw image data.

Example Process for Performing Noise Reduction

Figure 7:
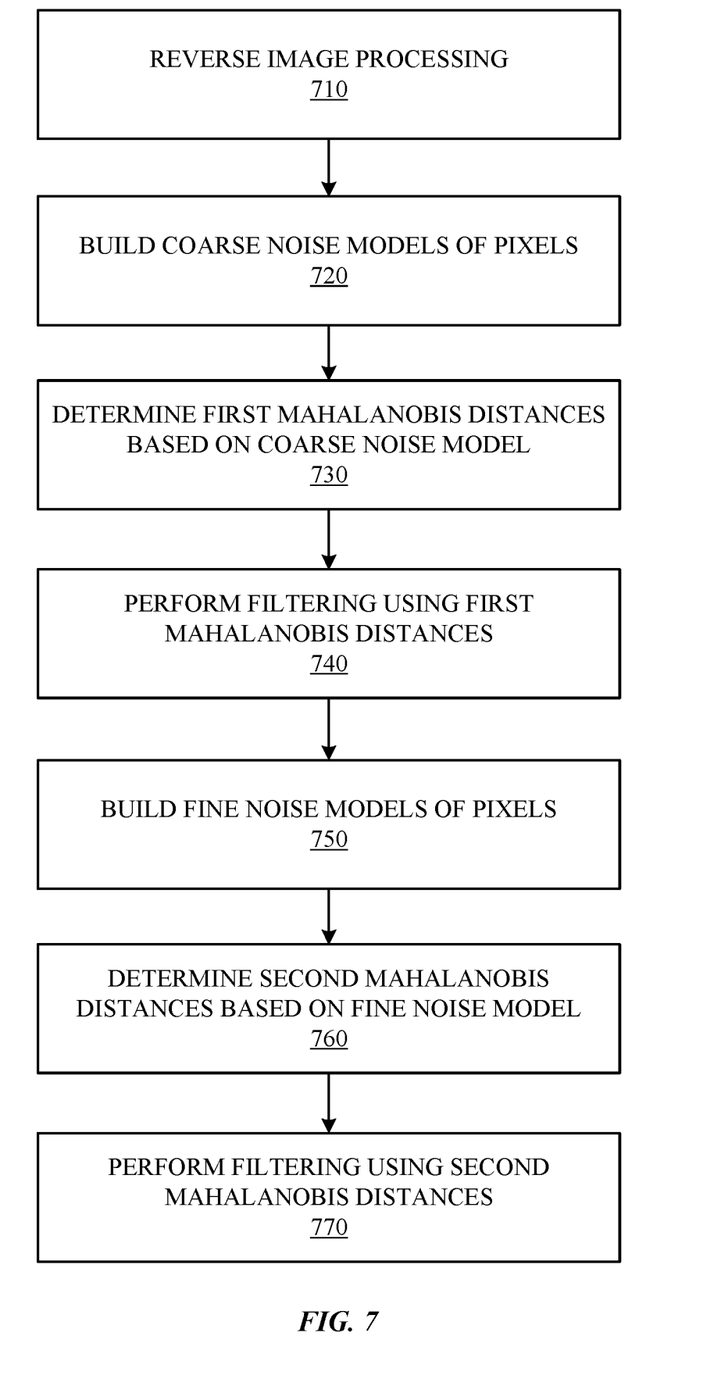
FIG. 7 is a flowchart illustrating a method of performing noise reduction using multiple noise models, according to one embodiment.

FIG. 7 is a flowchart illustrating a method of performing noise reduction using multiple noise models, according to one embodiment. The reversal processing circuit 606 reverses 710 at least part of image processing performed on raw pixel data received from an image sensor 202. The revised image processing may include, among other processes, prior linear and non-linear color space transformations and lens shading correction.

The coarse noise model circuit 616 builds 720 coarse noise models for pixels in an input image using pixel values of first neighboring pixels in the input image. The first Mahalanobis distance computation circuit 626 determines 730 the first Mahalanobis distances between pixels and their first neighboring pixels based on the first noise models.

The first bilateral filter 636 performs 740 filtering on the pixels based on the first Mahalanobis distances to obtain filtered pixel values. The fine noise model circuit 646 builds 750 fine noise models for the pixels using pixel values of second neighboring pixels. The second Mahalanobis distance computation circuit 656 determines 760 the second Mahalanobis distances between the pixels and the second neighboring pixels based on the second noise models.

The second bilateral filter circuit 668 performs 770 filtering on the first filtered pixel values based on the second Mahalanobis distances to obtain the noise reduced version 422 of the image data.

The process as described above with reference to FIG. 7 is merely illustrative. For example, the process of reversing 710 the image processing may be omitted if the input image data is in a raw image format. Moreover, additional processing may be performed on the image data, such as performing another stage of building finer noise models, determining Mahalanobis distances based on the finer noise models and performing filtering based on such Mahalanobis distances.

What is claimed is:

1. An apparatus for processing image data, comprising:
   a first noise model circuit configured to build a first noise model for a pixel in an input image using pixel values of first pixels neighboring the pixel in the input image;
   a first distance computation circuit coupled to the first noise model circuit and configured to compute first Mahalanobis distances between the pixel and the first neighboring pixels based on the first noise model;
   a first filter coupled to the first distance computation circuit and configured to perform filtering on the pixel based on the first Mahalanobis distances to obtain a first filtered image;
   a second noise model circuit coupled to the first filter and configured to build a second noise model for the pixel based on second pixels neighboring the pixel in the first filtered image;
   a second distance computation circuit coupled to the second noise model circuit and configured to compute second Mahalanobis distances between the pixel and the second neighboring pixels based on the second noise model; and
   a second filter coupled to the second distance computation circuit and configured to perform filtering on the input image based on the second Mahalanobis distances to obtain a second filtered image.

2. The apparatus of claim 1, wherein a number of the second neighboring pixels are more than or equal to a number of the first neighboring pixels.

3. The apparatus of claim 1, further comprising a first reversal processing circuit configured to reverse at least part of image processing performed on raw pixel data from an image capturing device to generate the input image.

4. The apparatus of claim 3, further comprising a second reversal processing circuit configured to reverse at least part of image processing performed on the raw pixel data to obtain a reverted image provided to the second noise model circuit for building the second noise model.

5. The apparatus of claim 3, wherein the reversed image processing comprises color space transformation and lens shading correction.

6. The apparatus of claim 1, wherein the first filter is a bilateral filter that uses a first number of pixel values, and the second filter is a bilateral filter that uses a second number of pixel values more than the first number of pixel values.

7. The apparatus of claim 1, further comprising:
   a sub-band splitter circuit coupled to the second filter to receive the second filtered image, the sub-band splitter configured to split the second filtered image into a first frequency data and a second frequency data of a lower frequency than the first frequency data.

8. The apparatus of claim 7, further comprising:
   a demultiplexer having an input coupled to an output of the sub-band splitter circuit to receive the second frequency data, the demultiplexer having a first output coupled to a subsequent processing circuit and a second output; and
   a scaler circuit coupled to the second output of the demultiplexer to receive the second frequency data, the scaler circuit configured to generate a downscaled version of the second frequency data as a third frequency data sent to the first noise model circuit for processing.

9. The apparatus of claim 7, wherein the second distance computation circuit is configured to send the second Mahalanobis distances to the sub-band splitter circuit, and wherein the sub-band splitter circuit is configured to identify relationships between pixels in the second filtered image based at least on the second Mahalanobis distances.

10. The apparatus of claim 1, wherein the first distance computation circuit is configured to compute photometric coefficients based on the first Mahalanobis distances for performing filtering at the first filter, and the second distance computation circuit is configured to compute photometric coefficients based on the second Mahalanobis distances for performing filtering at the second filter.

11. The apparatus of claim 1, wherein the input image has subpixels arranged in a Bayer pattern.

12. A method of processing image data, comprising:
   building a first noise model for a pixel in an input image using pixel values of first pixels neighboring the pixel in the input image;
   computing first Mahalanobis distances between the pixel and the first neighboring pixels based on the first noise model;
   performing filtering on the pixel based on the first Mahalanobis distances to obtain a first filtered image;
   building a second noise model for the pixel based on second pixels neighboring the pixel in the first filtered image;
   computing second Mahalanobis distances between the pixel and the second neighboring pixels based on the second noise model; and performing filtering on the input image based on the second Mahalanobis distances to obtain a second filtered image.

13. The method of claim 12, wherein a number of the second neighboring pixels are more than or equal to a number of the first neighboring pixels.

14. The method of claim 12, further comprising reversing at least part of image processing performed on raw pixel data from an image capturing device to generate the input image.

15. The method of claim 14, wherein the reversed image processing comprises color space transformation and lens shading correction.

16. The method of claim 15, further comprising reversing at least part of image processing performed on the raw pixel data for building the second noise model.

17. The method of claim 12, wherein performing filtering on the pixel based on the first Mahalanobis distances comprises performing bilateral filtering using a first number of pixel values, and wherein performing filtering on the first filtered pixel value comprises performing bilateral filtering using a second number of pixel values more than the first number of pixel values.

18. The method of claim 12, wherein computing the first Mahalanobis distances comprises computing photometric coefficients based on the first Mahalanobis distances for performing filtering at the first filter, and wherein computing photometric coefficients based on the second Mahalanobis distances for performing filtering at the second filter.

19. The method of claim 12, wherein the input image has subpixels arranged in a Bayer pattern.

20. A resampling circuit in an image processing pipeline, comprising:
  a first noise model circuit configured to build a first noise model for a pixel in an input image using pixel values of first pixels neighboring the pixel in the input image;
  a first distance computation circuit coupled to the first noise model circuit and configured to compute first Mahalanobis distances between the pixel and the first neighboring pixels based on the first noise model;
  a first filter coupled to the first distance computation circuit and configured to perform filtering on the pixel based on the first Mahalanobis distances to obtain a first filtered image;
  a second noise model circuit coupled to the first filter and configured to build a second noise model for the pixel based on second pixels neighboring the pixel in the first filtered image;
  a second distance computation circuit coupled to the second noise model circuit and configured to compute second Mahalanobis distances between the pixel and the second neighboring pixels based on the second noise model; and
  a second filter coupled to the second distance computation circuit and configured to perform filtering on the input image based on the second Mahalanobis distances to obtain a second filtered image.

* * * * *